US006611587B2

(12) United States Patent
Brown et al.

(10) Patent No.: US 6,611,587 B2
(45) Date of Patent: *Aug. 26, 2003

(54) METHODS FOR IDENTIFYING SERVICE PROCESSING OF TELEPHONE CALLS

(75) Inventors: John Carl Brown, Freehold, NJ (US); Jin-Shi Chen, Holmdel, NJ (US); Ron Lo, Holmdel, NJ (US); Eldred James Visser, Annandale, NJ (US)

(73) Assignee: AT&T Corp., New York, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/506,254

(22) Filed: Feb. 17, 2000

(65) Prior Publication Data

US 2003/0072433 A1 Apr. 17, 2003

Related U.S. Application Data

(63) Continuation of application No. 08/823,925, filed on Mar. 25, 1997, now abandoned.

(51) Int. Cl.[7] .................................................. H04M 3/42
(52) U.S. Cl. .............................. 379/221.14; 379/115.03
(58) Field of Search ..................... 379/112.05, 114.05, 379/114.28, 115.02, 115.03, 220.01, 221.02, 221.14, 242, 243, 244

(56) References Cited

U.S. PATENT DOCUMENTS

| 5,060,149 A | 10/1991 | Flurry et al. |
| 5,506,894 A | 4/1996 | Billings et al. |
| 5,550,899 A | 8/1996 | McLeod et al. |
| 5,583,926 A | 12/1996 | Venier et al. |
| 5,638,434 A | 6/1997 | Gottlieb et al. |
| 5,764,749 A * | 6/1998 | Zelazny et al. ........ 379/221.02 |
| 5,917,899 A * | 6/1999 | Moss et al. ............. 379/221.08 |
| 5,917,902 A * | 6/1999 | Saucier ....................... 379/242 |
| 5,937,053 A | 8/1999 | Lee et al. |
| 5,940,490 A * | 8/1999 | Foster et al. ........... 379/211.02 |
| 6,134,316 A * | 10/2000 | Kallioniemi et al. .. 379/220.01 |

OTHER PUBLICATIONS

Atoui, M. "Virtual Private Network Call Processing in the Intelligent Network" Proceedings of the International Conference on Communications, U.S., New York, IEEE, vol.–, pp. 561–565 XP000326744 ISBN: 0–7803–0599–X; entire document.

* cited by examiner

Primary Examiner—Scott L. Weaver

(57) ABSTRACT

The present invention comprises methods for efficiently identifying international outbound calls, in the telecommunications network (TN) of the outgoing country, which should be screened as possibly requiring processing according to a Global Virtual Network Service (GVNS), as opposed to conventional international long distance (ILD) call processing. In particular, the present invention is directed to outbound international GVNS calls, known as "on-net," which are from one GVNS location to another GVNS location of the same customer. International calls that are not Outbound International GVNS On-net calls, referred to as Other ILD calls, include at least three types: standard ILD, non-GVNS data and international GVNS off-net calls. Standard ILD, non-GVNS data calls and international GVNS off-net calls all have a routing number which comprises a country code (CC) followed by a national number (NN). In the present invention, all Outbound International GVNS On-net calls have a routing number which begins with a CC followed by a country code suffix (CC-suffix). Therefore, the presence of a CC-suffix after the CC in a call routing number indicates that the call should be screened as being, possibly, an Outbound International GVNS On-net call.

7 Claims, 10 Drawing Sheets

METHODS FOR IDENTIFYING SERVICE PROCESSING OF TELEPHONE CALLS

This is a Continuation of application Ser. No. 08/823,925 filed Mar. 25, 1997 now abandoned. The entire disclosure of the prior application is hereby incorporated by reference herein in its entirely.

TECHNICAL FIELD OF THE INVENTION

The present invention relates to identifying the service processing of a telephone call. More particularly, the present invention relates to identifying the service processing of an international telephone call by adding a predetermined suffix to the country code of the call's routing number.

BACKGROUND OF THE INVENTION

The present invention relates to the call processing on a telecommunications network (TN), such as the AT&T Switched Network (ASN), for outbound international calls on a Global Virtual Network Service (GVNS), such as the AT&T Global Software Defined Network (GSDN) service, where the call is from one GVNS location to another GVNS location of the same customer. A GVNS call from one GVNS location to another GVNS location (for the same customer) is known as an "on-net" call. The type of call the present invention relates to is referred to as an Outbound International GVNS On-net call. In accordance with ITU-T Recommendation F.16 (ITU is the International Telecommunications Union), incorporated herein by reference, GVNS is a global switched service supported by multiple international networks and is offered to customers over Public Switched Telephone Network (PSTN) and/or Integrated Services Digital Network (ISDN). While minimizing the need for dedicated network resources, GVNS provides private network functions to users at geographically dispersed international locations. GVNS provides a customer with a virtual private network (VPN).

International calls that are not Outbound International GVNS On-net calls (of either the voice or data type) will be referred to as Other international long distance (ILD) calls. There are at least three types of Other ILD calls (for the ASN): standard ILD calls, non-GVNS data calls and international GVNS off-net calls.

A standard (ILD) call has a routing number known as an international public number (IPN). For the purposes of this patent, IPN refers to the international public telecommunications number or the international ISDN number. An IPN comprises a country code (CC) followed by a national (significant) number (NN). The NN comprises a national destination code (NDC) followed by a subscriber number (SN). The term national (significant) number is defined by the ITU, but will be referred to as the NN for the purposes of this patent. The terms NDC and SN are defined by ITU-T recommendation E.164, incorporated herein by reference.

A non-GVNS data call has the same kind of IPN routing number as a standard ILD call.

A known way of distinguishing Other ILD calls from an Outbound International GVNS On-net call is to begin the Outbound International GVNS On-net routing number with a pseudo country code (PCC). A PCC fills the same position in a routing number filled by a CC in Other ILD calls, but a PCC is a numeric code which has not been assigned to a particular geographic region or global service application by the ITU—Telecommunication Standardization Sector (ITU-TSS). Because PCCs fill the same position as a CC, they can be screened efficiently by a TN both in terms of minimal additional call processing time for Other ILD calls and minimal changes to TN software. While PCCs provide an efficient means by which a TN may distinguish between Other ILD calls and Outbound International GVNS On-net calls, there are two major problems with the use of PCCs. Firstly, there are a limited number of PCCs. Secondly, a PCC can, without warning to the TN provider, be assigned (e.g., become a real CC) if the ITU-TSS so decides.

It would therefore be desirable to provide an efficient method for distinguishing between Other ILD calls and an Outbound International GVNS On-net call which would overcome the disadvantages of PCCs.

SUMMARY OF THE INVENTION

The above and other objects of the invention are accomplished by methods which provide a country code suffix (CC-suffix) whose presence after the CC in a call routing number indicates that the call should be screened as being, possibly, an Outbound International GVNS On-net call. It is desirable to minimize the number of Other ILD calls which are subject to extra screening for being, possibly, an Outbound International GVNS On-net call. Selecting a CC-suffix which comprises the national trunk prefix (NTP) or domestic application prefix digit (DAPD) insures that only a small percentage of Other ILD calls, such as are represented by mis-dialed standard ILD calls or mis-dialed non-GVNS data calls, contain the CC-suffix. The DAPD is defined as a single digit code which can only be used for the domestic applications of the terminating GVNS country. If the NTP or DAPD cannot be used, then an NDC of the receiving country which receives minimal Other ILD call traffic is selected.

BRIEF DESCRIPTION OF THE DRAWINGS

The above and other objects of the present invention will be apparent upon consideration of the following detailed description, taken in conjunction with the accompanying drawings, in which like reference characters refer to like parts throughout, and in which.

DETAILED DESCRIPTION OF THE INVENTION

The present invention comprises a method by which a TN can efficiently and effectively identify Outbound International GVNS On-net calls from Other ILD calls.

Most international calls are of the Other ILD call type and, therefore, require conventional processing by the TN.

However, certain international calls (on TNs which provide the GVNS service) are of the Outbound International GVNS On-net type and require non-conventional processing by the TN. According to the present invention, these GVNS calls have a routing number (in the TN of the call originating country) which begins with a CC followed by a country code suffix (CC-suffix). The remainder of the routing number is of a GVNS format which permits further processing of the call within the TN of the call receiving country. For a GVNS call, the remainder of the routing number could comprise a Customer ID (CID) and a Terminating Network Routing Number (TNRN). The terms GVNS user group ID (GUG ID) and TNRN are defined in ITU-T recommendation Q.85.6, incorporated herein by reference. For the purposes of this patent the term CID is understood to be synonymous with GUG ID.

The current maximum length of a routing number is 15 digits. In this example, the routing number for a GVNS call is divided among these 15 digits as follows. The CCs and CC-suffixes each range from 1–3 digits in length, with the maximum length of any CC concatenated with any CC-suffix being 4 digits. The maximum length of the CID is 4 digits and the length of the TNRN is 7 digits.

Figure 1:
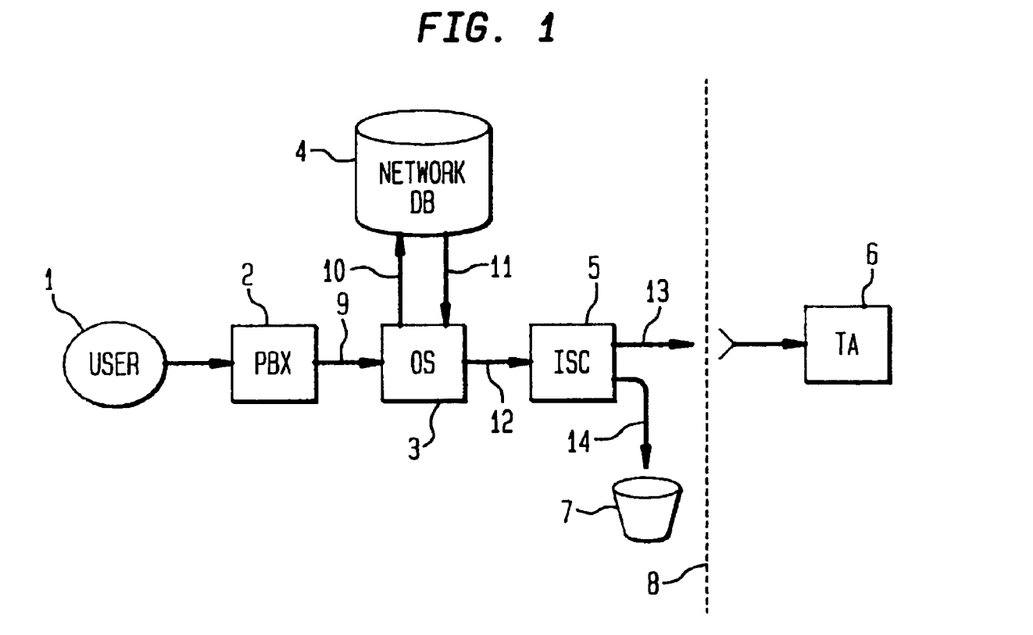
FIG. 1 is an illustrative schematic diagram that depicts the main telecommunication network components involved in processing an Outbound International GVNS On-net call according to the present invention.

FIG. 1 is an illustrative schematic diagram that depicts the main telecommunication network components involved in processing an Outbound International GVNS On-net call according to the present invention. FIG. 1 is divided into two halves by dashed line 8, with the left half being the TN of the call originating country and the right half being the foreign country's receiving TN. FIG. 1 depicts a user 1 connected to a private branch exchange (PBX) 2. Alternatively, user 1 could be connected to local exchange carrier (LEC) switch. FIG. 1 will now be further explicated in conjunction with the call processing flowchart of FIG. 2.

The call processing flow chart of FIG. 2 begins with the question of whether the user placing the call is doing so from an on-net location (Step 10).

If the user is not at an on-net location, Steps 20–40 describe the conventional call processing performed when calling an IPN. Specifically, the user dials an international prefix plus an international public number in Step 20. Next, in Step 30, by conventional ILD call processing the appropriate originating switch (OS) processes the call. In Step 40, the OS sends the call to the appropriate ISC.

If user 1 is at an on-net location, steps 50–90 describe the process by which a call from user 1, to another on-net location, is routed to the originating switch 3(OS 3).

In Step 50 the user dials a number (known as the dialed number or "DN") in order to make a GVNS call to a foreign on-net location. The DN may be an IPN or a number private to the GVNS (or VPN) customer the user is associated with. In Step 60, the call flow processing is divided depending upon whether the customer's PBX is directly connected to the OS.

Step 70 illustrates the case where user 1 is directly connected to OS 3 via a private branch exchange 2 (PBX 2). In this case, the OS receives the 10-digit automatic identification number (ANI) of the facility over which the DN arrives at the OS. FIG. 1 depicts this type of connection wherein dialed number 9 (DN 9), dialed by user 1, travels from PBX 2 to OS 3.

Steps 80–90 depict the case where user 1 is connected to OS 3 via a local exchange carrier (LEC) switch. In this case, the DN goes to a LEC with a LEC-prefix which tells the LEC that the DN is for the ASN. At Step 90, the LEC determines the ANI and sends it, and the DN, to the OS.

Steps 100–220 depict the processing by OS 3 of the call it receives from user 1.

Steps 100–120 describe the process by which OS 3 formulates a query 10 which it sends to a network database 4. Specifically, the OS identifies the incoming call as a VPN call based upon the facility that carries the incoming call (Step 100). Next, the OS identifies the network database that a query should be sent to based on the ANI. In Step 120, the OS sends a query to the network database including the ANI and the DN.

Steps 130–150 illustrate the processing by the network database 4 by which it formulates a reply 11 which is sent back to OS 3. First, the network database accesses the appropriate customer record based on the ANI in the query received (Step 130). Next, the network database finds a field within the customer record which matches the DN. For a GVNS on-net call, the field found will include the information listed in Step 140. The network database then formulates a reply to the OS query including the information listed in Step 150.

Step 140 depicts the information returned in response to the specific dialing, in Step 50, to a foreign on-net location. Among the information returned is a foreign administration ID (FAI) which identifies the carrier (or terminating administration) in the foreign country to whom the call should be sent.

Steps 160–220 depict the process by which OS 3 receives the network database reply (Step 160) and then routes the call to the appropriate international switching center 5 (ISC 5). This process also involves extracting billing information from the reply for billing purposes (Step 170). Of particular importance is the service identity (SI) value derived in Step 180. The SI value indicates which type of service a call is part of, which is the "GVNS on-net" service in the case of Step 180. Next, the OS analyzes the first three digits of the routing number and determines that these digits identify a GVNS country (Step 190). Then, the OS uses the first three digits of the routing number and the SI to determine the ISC that the call should be routed to, unless the call is to a multi-carrier country, in which case the FAI is also utilized (Step 200). In the case where ISC 5 is a different switch from OS 3 (determined by Step 210), the call is sent from OS 3 to ISC 5 via a signaling message 12. The contents of the signaling message includes the information listed in Step 220.

Steps 230–330 describe the processing of ISC 5. The key aspect of the present invention is illustrated in Steps 240–280. Step 240 depicts the conventional digit-by-digit translation which is currently done for Other ILD calls as well as for GVNS calls. Therefore, Other ILD calls processed according to Steps 20–40 will also be processed according to step 240 when they arrive at the appropriate ISC. Step 250, however, sorts out possible Outbound International GVNS On-net calls from Other ILD calls by looking for a CC-suffix after the CC. The CC-suffix is chosen such that almost all Other ILD calls do not appear to have a CC-suffix and are therefore processed in the conventional manner of Step 260. Those Outbound International GVNS On-net calls which have a CC-suffix, or those few Other ILD calls which appear to have a CC-suffix, undergo the additional screening of Step 270 in which the SI value is checked.

A major object of the present invention is to minimize the number of Other ILD calls which appear to have a CC-suffix and therefore pass through the additional processing of Step 270. The number of "false positives" is determined by the particular digit values chosen as a country's CC-suffix. Step 280 depicts how the choice of CC-suffix determines the two main types of processing which may follow the determination that a call is an Other ILD call. The fewest Other ILD calls are effected if the CC-suffix selected cannot be part of a correctly dialed Other ILD call. In this case, only misdialed Other ILD calls are subjected to the additional screening of Step 270 and such calls are killed upon being identified as shown in Step 282. The killing of a call by ISC 5 is represented graphically in FIG. 1 by killed call 14 traveling into call "bucket" 7.

For certain countries, however, one may be forced to pick a CC-suffix which can be part of a correctly dialed Other ILD call. In this case, a CC-suffix which is least in use among Other ILD call traffic, while introducing minimal routing administration costs, is chosen. As shown in Step 280, a call which appears to have a CC-suffix but which is not recognized as an Outbound International GVNS On-net call is therefore processed according to the conventional ILD call processing of Step 260.

For an Outbound International GVNS On-net call, Steps 290–330 handle determining the appropriate terminating administration (TA) and reformatting the routing number for the TA.

Specifically, Step 290 determines whether the destination country is a multi-carrier country. If it is a multi-carrier country, Step 300 determines the TA from the FAI value. Next, the CC digits are deleted from the routing number (Step 310). Then the CC-suffix is deleted from the routing number (Step 320). Finally, in Step 330, the ISC determines the outgoing international trunk and prefixes the routing number with the service ID needed by the TA (SIDTA).

The specific procedure for selection of a CC-suffix will now be presented.

CC-suffixes are chosen to fulfill the following two goals: (i) to minimize their impact on the call processing of Other ILD calls, and (ii) to minimize routing administration issues at the ISCs. A CC-suffix may be in one of the four following specific formats. These formats are presented in order of decreasing fulfillment of these two main goals.

Firstly, a CC-suffix may comprise the national trunk prefix (NTP) of the GVNS destination country plus the "0" digit. Table 1 (below) identifies a subset of potential GVNS countries, their CCs and their NTPs. As can be seen, most countries use the "0" digit as the NTP.

TABLE 1

Examples of GVNS Countries, their Country Codes and National Trunk Prefixes

| | GVNS Countries | Country Code (CC) | National Trunk Prefix (NTP) |
|---|---|---|---|
| 1. | Australia | 61 | 0 |
| 2. | Belgium | 32 | 0 |
| 3. | Brazil | 55 | 0 |
| 4. | Finland | 358 | 0 |
| 5. | Hong Kong | 852 | None*** |
| 6. | Ireland | 535 | 0 |
| 7. | Netherlands | 31 | 0 |
| 8. | New Zealand | 64 | 0 |
| 9. | Norway | 47 | None*** |
| 10. | Spain | 34 | 9 |

***Does not have an NTP but uses, or plans to use, "0" as the domestic application prefix digit.

The NTP is defined by the ITU-T recommendations as being that value which a country uses to identify its intra-country long distance calls. The ITU-T recommends that the NTP be the "0" digit and that this value be precluded from being used as the first digit of an NN.

Having the NTP as part of the CC-suffix, by itself, ensures that the overwhelming bulk of Other ILD calls will not be subjected to the additional screening of Step 270. This is because the overwhelming bulk of Other ILD calls comprises correctly dialed standard ILD or non-GVNS data calls. Appending an additional "0" digit to the NTP even further reduces the number of Other ILD calls subjected to the additional screening of Step 270.

Secondly, a CC-suffix may comprise the domestic application prefix digit (DAPD) of the GVNS destination country plus the "0" digit. As with the NTP, having the DAPD as part of the CC-suffix, by itself, ensures that the overwhelming bulk of Other ILD calls will not be subjected to the additional screening of Step 270. As with the NTP, appending an additional "0" digit to the DAPD even further reduces the number of Other ILD calls subject to the additional screening of Step 270. The DAPD is less desirable than the NTP because of the greater potential routing administration costs if the receiving country decides to change its DAPD.

Thirdly, a CC-suffix may comprise the NTP or the DAPD of the destination GVNS country (without a following "0" digit). For countries with three-digit country codes, there is only one digit left for the GVNS CC-suffix assigned to these countries. As stated above, the use of the NTP or DAPD, by itself, as part of the CC-suffix ensures that all correctly dialed standard ILD or non-GVNS data calls, which represent the overwhelming bulk of calls to any country, will not be subjected to the extra call screening of Step 270.

Fourthly, a CC-suffix may comprise the leading digit or digits of a valid (or in-use) national destination code (NDC) of the call receiving country. In this case, it is best to use an NDC which receives the least Other ILD call traffic so that the minimum amount of Other ILD call traffic is subjected to the additional screening required of GVNS calls.

It should be noted that a vacant (unused) NDC would not be used for a CC-suffix despite the fact that the only Other ILD calls to use it would be misdialed calls. This is because a vacant NDC, like the PCCs of prior art, could become valid NDCs without notice to the telecommunications provider of the sending country.

Consistent with achieving the above two goals, and producing a CC-suffix in one of the four formats discussed above, FIGS. 3A–3B show a general procedure for selecting a CC-suffix which may be applied to any particular country. The procedure of FIGS. 3A–3B divide the selection of a CC-suffix into eight cases.

Figure 3A:
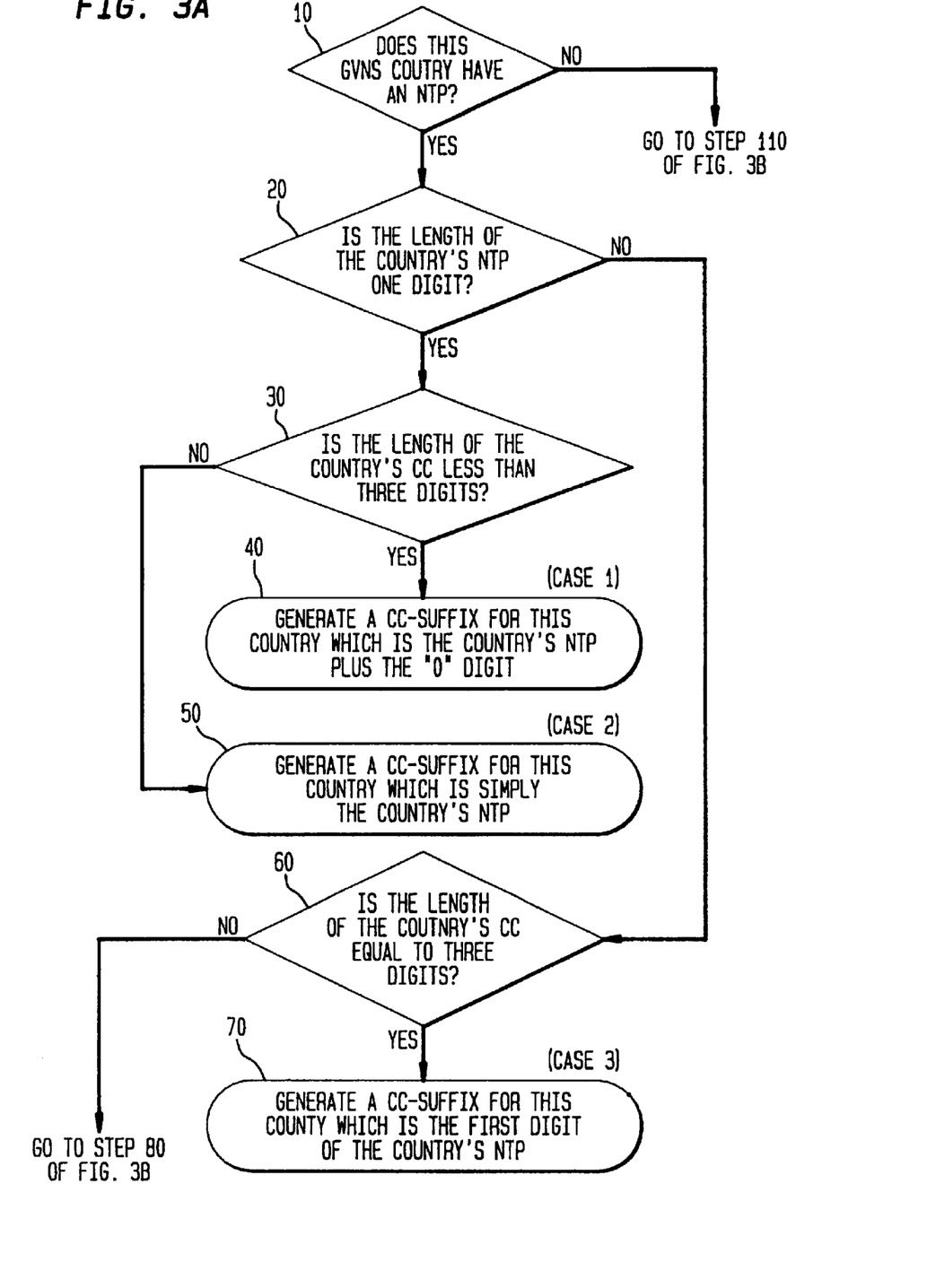
FIGS. 3A–3B depict a procedure for selecting a CC-suffix according to the present invention.

The first Step of the procedure is to determine whether the GVNS country in question has an NTP (Step 10).

Figure 3B:
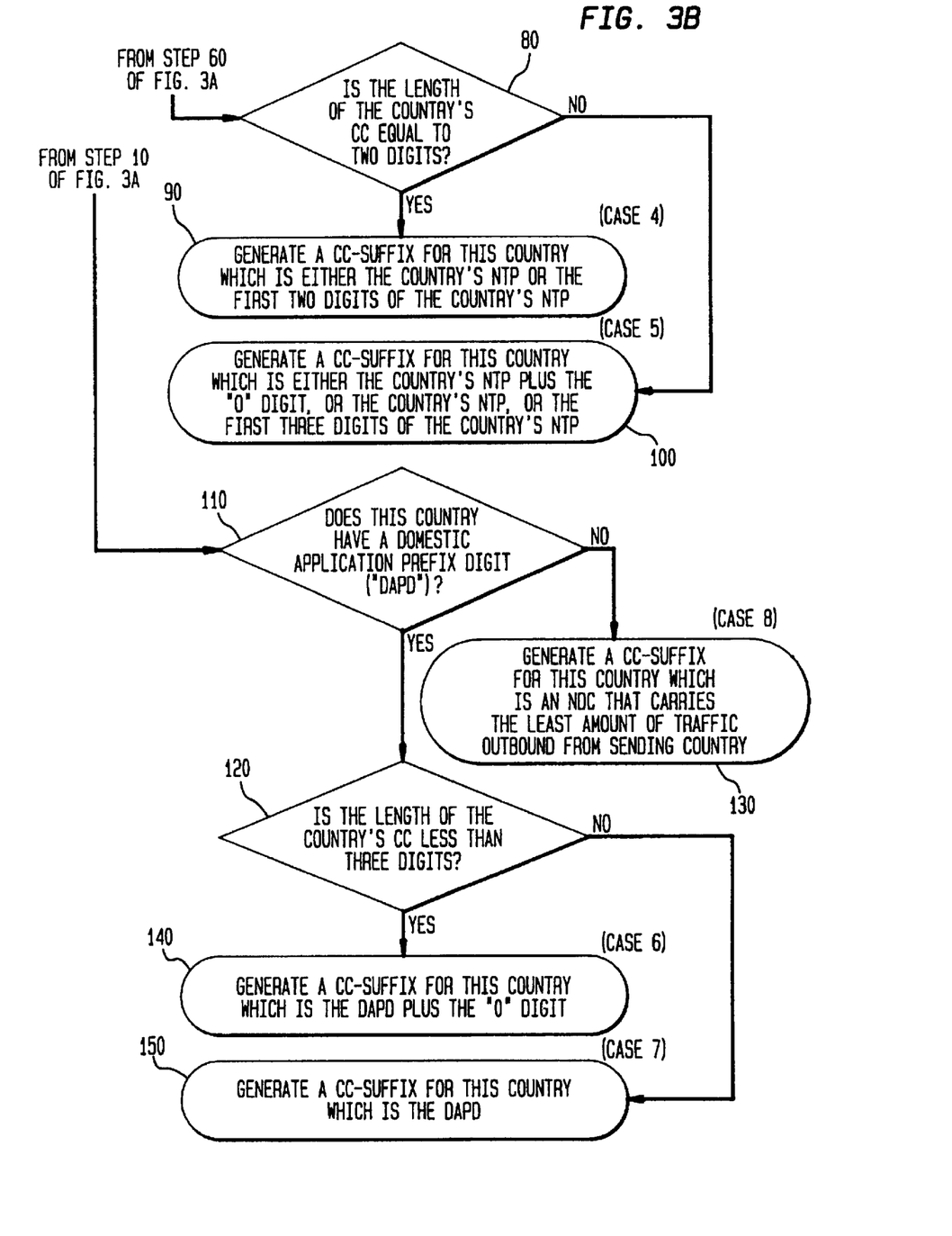

Steps 20–100 deal with the case of the country having an NTP, while Steps 110–150 deal with a country that lacks an NTP.

Step 20 asks whether the length of the country's NTP is one digit with an answer of "yes" leading to the processing of Steps 30–50. An answer of "no" to Step 20 leads to the processing of Steps 60–100.

Step 30 asks whether the length of the country's CC is less than three digits. If the answer is "yes," then Step 40 generates a CC-suffix for this country which is the country's NTP plus the "0" digit (Case 1). If the answer to Step 30 is "no," then a CC-suffix for the country is generated which is simply the country's NTP (Case 2).

Step 60 asks whether the length of the country's CC is equal to three digits. If the answer is "yes," then Step 70 generates a CC-suffix for the country which is the first digit of the country's NTP (Case 3). If the answer to Step 60 is "no," then Step 80 asks whether the length of the country's CC is equal to two digits. If the answer to Step 80 is "yes,"

then a CC-suffix is generated (by Step 90) for the country which is either the country's NTP or the first two digits of the country's NTP (Case 4). If the answer to Step 80 is "no," then a CC-suffix is generated (by Step 100, Case 5) for the country which is either (i) the country's NTP plus the "0" digit, or (ii) the first three digits of the country's NTP.

Step 110 asks whether the country in question has a DAPD. If the country does not, Step 130 generates a CC-suffix which is an NDC of the receiving country that carries the least amount of traffic outbound from the sending country (Case 8). Otherwise, Step 120 asks whether the length of the country's CC is less than three digits. If the answer to Step 120 is "yes," then Step 140 generates a CC-suffix which is the DAPD plus the "0" digit (Case 6). If the answer to Step 120 is "no," then Step 150 generates a CC-suffix which is simply the DAPD (Case 7).

In addition to indicating that calls to a particular country should be screened as possibly requiring processing for a particular service, the CC-suffix can further be used to carry additional information such that when the service processing of a call is verified it receives an additional special treatment. The additional information which a CC-suffix can carry may be grouped into the following four categories: customer identification parameters, billing parameters, routing and service quality parameters and service priority parameters. Examples of customer identification parameters would be using a CC-suffix to identify either a particular customer or a customer class. Examples of billing parameters would be using a CC-suffix to identify billing rates or discount rates. Examples of routing and service quality parameters would be using a CC-suffix to identify the compression rate, network or type of facility. Having the CC-suffix indicate the network of the receiving country is a means of augmenting the function provided by the FAI. Examples of service priority parameters would be using a CC-suffix to identify call completion rate.

Figure 2A:
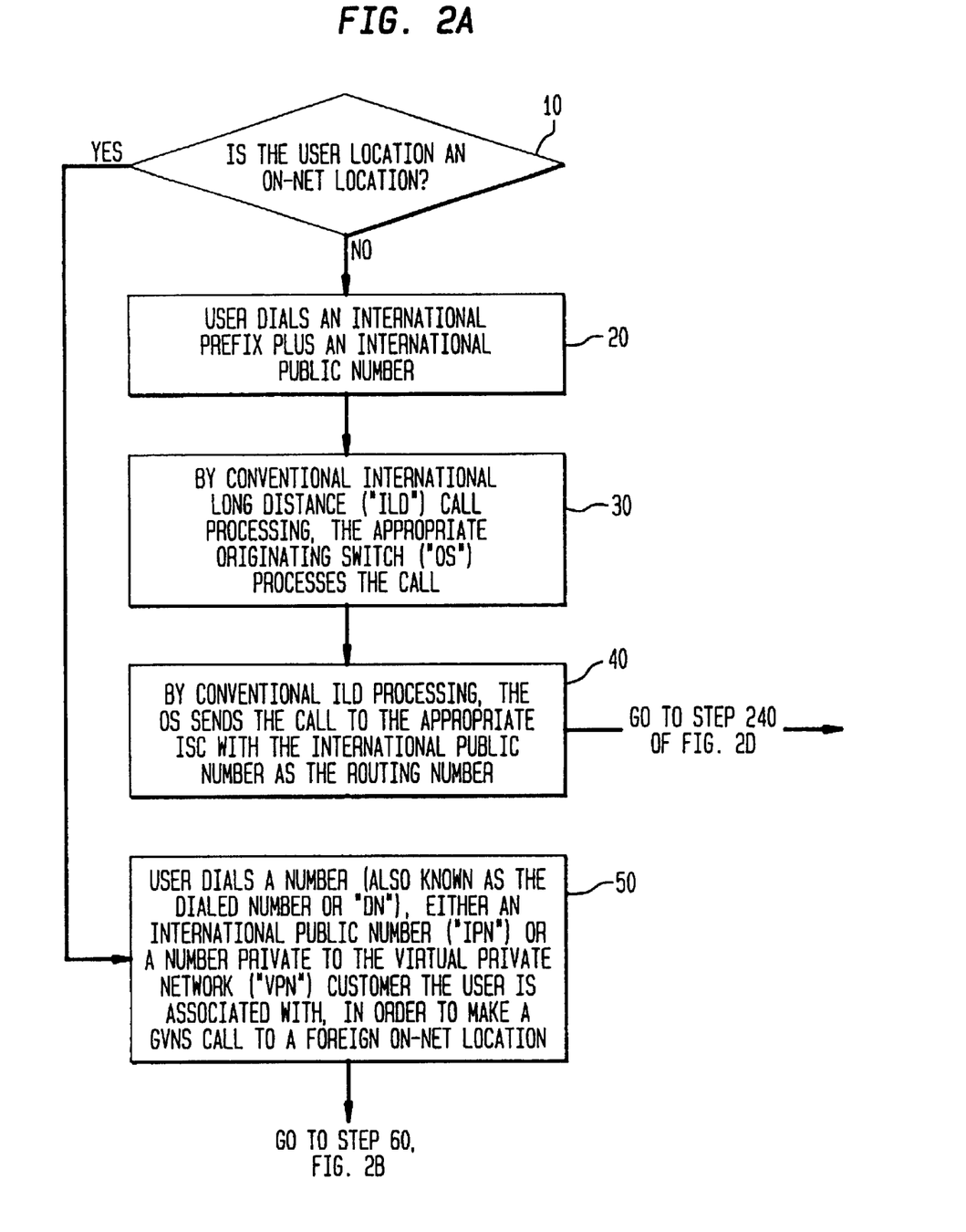
FIGS. 2A–2F depict the call flow processing for an Outbound International GVNS On-net call according to the present invention.
Figure 2B:
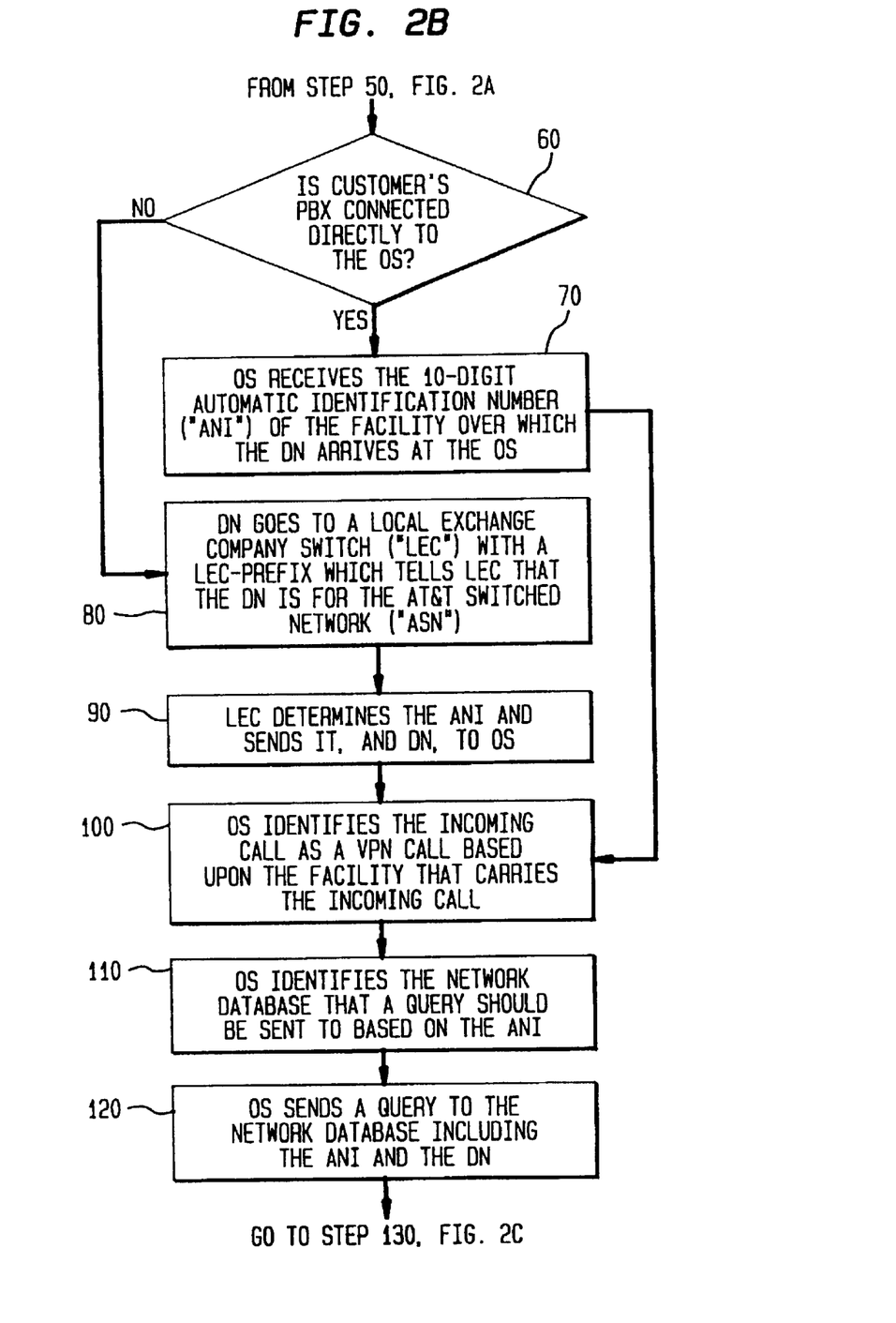
Figure 2C:
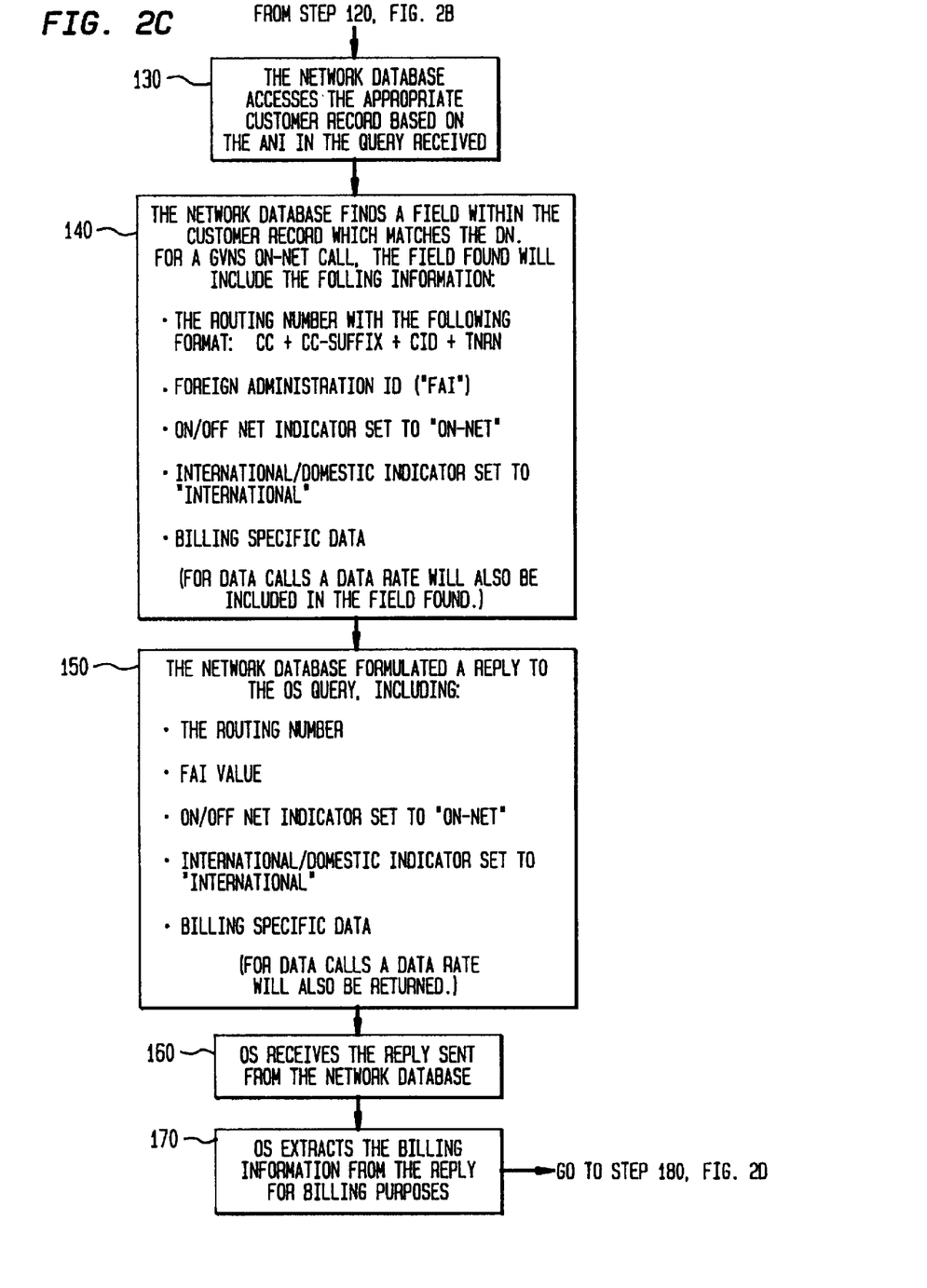
Figure 2D:
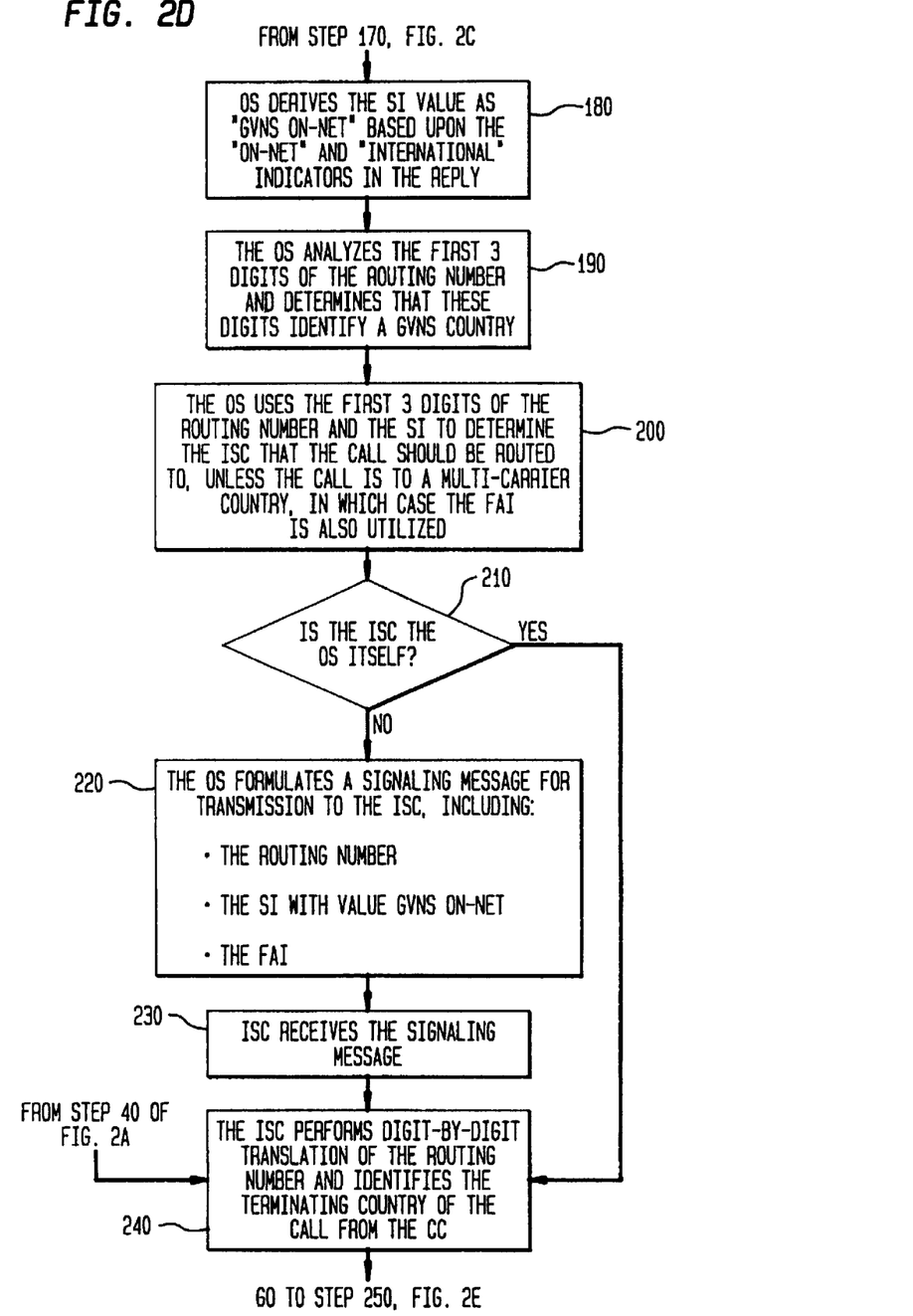
Figure 2E:
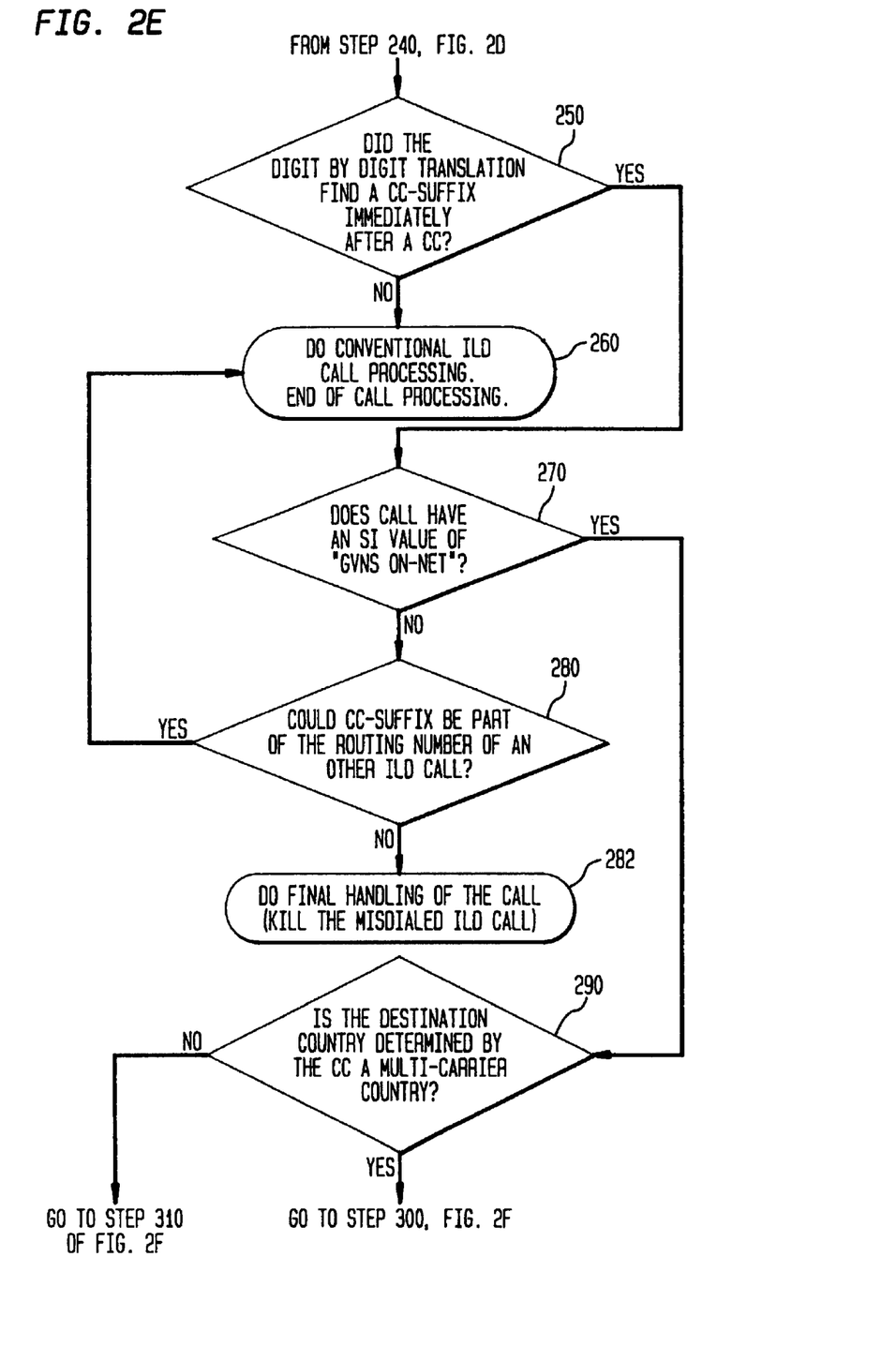
Figure 2F:
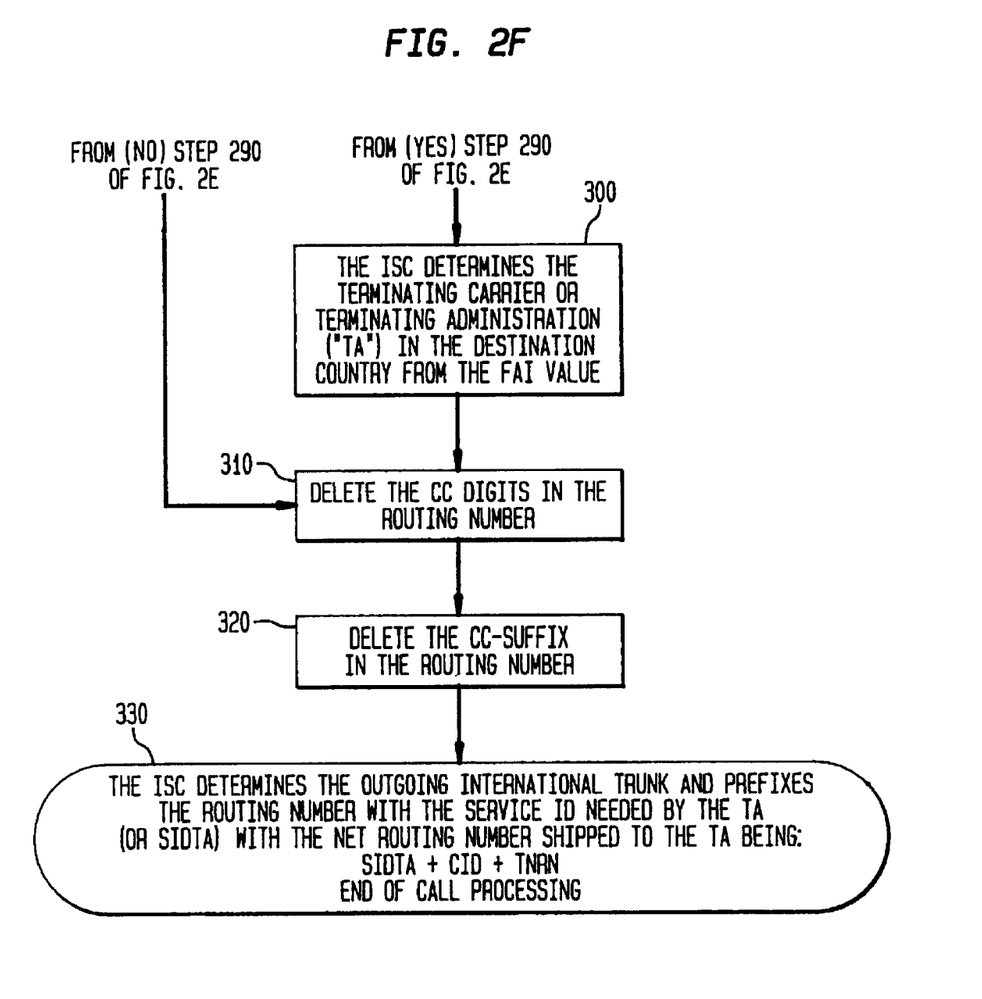
Figure 4:
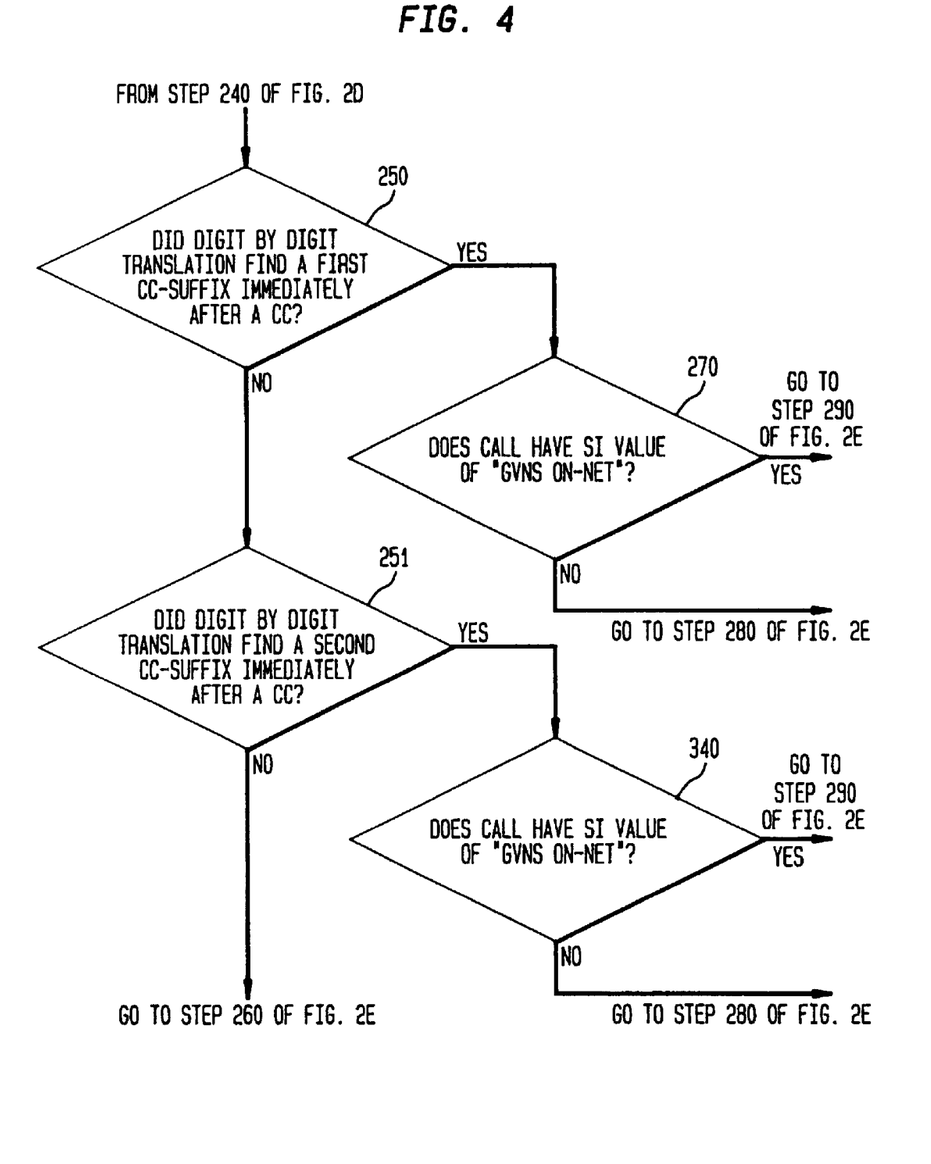
FIG. 4 depicts an exemplary extension to the call flow processing of FIGS. 2A–2F to provide special treatment of calls depending upon more than one CC-suffix value per country code.

FIG. 4 depicts an exemplary extension to the call flow processing of FIG. 2E to provide special treatment of calls depending upon the additional information CC-suffix parameters. In particular, FIG. 4 depicts replacing Step 250 of FIG. 2E with Steps 250 and 251 that test for, respectively, one of two CC-suffixes for a particular country. If the first CC-suffix is found, then the call service screening of Step 270 is performed. If the service type indicated by the first CC-suffix is verified (the answer to Step 270 is yes), then Steps 290–330 of FIGS. 2E–2F are performed, but modified to accomplish a first special treatment of the call. If the answer to Step 270 is no, then a first CC-suffix was falsely identified in Step 250 and alternative processing proceeds with Step 280. If the second CC-suffix is found (by Step 251), then the call service screening of Step 340 is performed. If the service type indicated by the second CC-suffix is verified (the service type indicated by the second CC-suffix being the same as the service type indicated by the first CC-suffix), then a separate set of steps, similar to those of Steps 290–330, is performed to accomplish the same basic service as accomplished by Steps 290–330 but modified to provide a second special treatment of the call (wherein the second special treatment differs from the first special treatment provided by modified Steps 290–330). If the answer to Step 340 is no, then a second CC-suffix was falsely identified in Step 251 and alternative processing proceeds with Step 280.

A particular way of encoding the additional information is to provide each category of CC-suffix parameter with its own field of digits in the CC-suffix.

A specific example of using the CC-suffix to indicate the network of the receiving country is for Case 1 of FIG. 3A.

For Case 1, if this is a GVNS hub country, multiple CC-suffixes are assigned to that country, instead of just the NTP plus the "0" digit, to identify different types of GVNS calls to that hub country. NTP plus the "0" digit is assigned to GVNS traffic to the hub country. CC-suffixes consisting of the NTP plus the digit "1" through "9" are reserved to facilitate network routing arrangements by identifying a "child" of the GVNS hub (parent) country to which a GVNS call should be routed.

Table 2 (below) depicts the application of each of the eight cases of FIGS. 3A–3B to the countries of Table 1 and lists the countries to which each case is applicable.

TABLE 2

| | |
|---|---|
| Case 1 | Descriptions:<br>The GVNS country has an NTP defined and the length of its NTP is 1 and the length of its country code is less than 3.<br>CC-suffix = NTP + the "0" digit<br>Example Applicable GVNS Countries (6):<br>Non-hub GVNS countries: Australia, Belgium, Brazil, Netherlands, Spain, and New Zealand.<br>For GVNS hub countries:<br>i) NTP + "0" is for the GVNS hub traffic, and<br>ii) NTP + N, where N is from 1 to 9, are reserved to indicate traffic to a child of the hub country. |
| Case 2 | Descriptions:<br>The GVNS country has an NTP defined and the length of its NTP is 1 and the length of its country code is 3.<br>CC-suffix = NTP<br>Example Applicable GVNS Countries (2):<br>Finland, Ireland |
| Case 3 | Descriptions:<br>The GVNS country has an NTP defined and the length of its NTP is greater than 1 and the length of its country code is 3.<br>CC-suffix = the first digit of NTP<br>Example Applicable GVNS Countries (0): None |
| Case 4 | Descriptions:<br>The GVNS country has an NTP defined and the length of its NTP is greater than 1 and the length of its country code is 2.<br>CC-suffix = NTP or the first two digits of NTP<br>Example Applicable GVNS Countries (0): None |
| Case 5 | Descriptions:<br>The GVNS country has an NTP defined and the length of its NTP is greater than 1 and the length of its country code is 1.<br>CC-suffix = i) NTP + "0", or ii) NTP, or iii) the first three digits of NTP<br>Example Applicable GVNS Countries (0): None |
| Case 6 | Descriptions:<br>The GVNS country has a Country Code length of less than 3-digits and has not defined an NTP but has defined a domestic application prefix digit.<br>CC-suffix = The one-digit code + "0"<br>Example Applicable GVNS Countries (1)<br>Norway |
| Case 7 | Descriptions:<br>The GVNS country has a Country Code length of 3-digits and has not defined an NTP but has defined a domestic application prefix digit.<br>CC-suffix = The one-digit code<br>Example Applicable GVNS Countries (1)<br>Hong Kong |
| Case 8 | Descriptions:<br>The GVNS country has not defined an NTP nor a domestic application prefix digit.<br>CC-suffix = A valid NDC that carries the least amount of international outbound traffic<br>Example Applicable GVNS Countries (0): None |

In accordance with the invention, Table 3 (below) lists the proposed CC-suffixes for GVNS countries and the cases which they fall under from FIGS. 3A–3B. In accordance with the procedure described above, each of the GVNS hub countries of Table 3 (Netherlands and Spain) have been assigned multiple CC-suffixes.

TABLE 3

| GVNS Countries | Country Code (CC) | National Trunk Prefix (NTP) | Proposed GVNS CC-suffix |
|---|---|---|---|
| Case 1 Countries: The GVNS countries that have defined an NTP and the length of their NTPs is 1 and the length of their country codes is less than or equal to 2. | | | |
| 1. Australia | 61 | 0 | 00 |
| 2. Belgium | 32 | 0 | 00 |
| 3. Brazil | 55 | 0 | 00 |
| 4. Netherlands | 31 | 0 | 00-GVNS hub country 01-Child 1 02-Child 2 |
| 5. Spain | 34 | 9 | 90-GVNS hub country 91-Child 1 |
| 6. New Zealand | 64 | 0 | 00 |
| Case 2 Countries: The GVNS countries that have defined an NTP and the length of their NTPs is 1 and the length of their country codes is 3. | | | |
| 1. Finland | 358 | 0 | 0 |
| 2. Ireland | 353 | 0 | 0 |
| Case 6 Countries: The GVNS countries that have not defined an NTP but have defined a domestic application prefix digit and the length of their country codes is less than 3. | | | |
| 1. Norway | 47 | None | 00 |
| Case 7 Countries: The GVNS countries that have not defined an NTP but have defined a domestic application prefix digit and the length of their country codes is 3. | | | |
| 1. Hong Kong | 852 | None | 0 |

If the user had dialed a foreign off-net location in Step 50, known as an outbound international GVNS off-net call, then Step 140 would have returned the following information from the network database. The routing number comprises the CC plus the NN. The FAI value is not present if the call is routed proportionally to a multi carrier country. The on/off net indicator is set to "off-net." The international/domestic indicator is set to "international." Processing of this type of call, from Steps 50 to 130, is substantially the same as shown in FIG. 2. Following Step 140, the most significant difference for processing a GVNS off-net call, from that shown in FIG. 2, is that the SI value is derived as "GVNS off-net" in Step 180 by the OS. In addition, even if a possible CC-suffix is located in Step 250 by the ISC, Step 270 cannot find the call having an SI value of "GVNS on-net." As shown in Step 50, the DN dialed for an outbound international GVNS off-net call can be either an IPN or a number private to the customer the user is associated with.

If the user had dialed a domestic location in Step 50, then Step 140 would have returned the following information from the network database. The routing number comprises a domestic public number (if the call is to an off-net location) or a network specific routing number (if the call is to an on-net location). There is no FAI value. The on/off net indicator is set to "on-net" for a call to an on-net location or "off-net" for a call to an off-net location. The domestic/international indicator is set to "domestic." The form of the domestic DN dialed in Step 50 (for a call to either an on-net or off-net location) can be either a domestic public number or a number private to the customer the user is associated with. The processing of domestic calls, following Step 140, could be done in a way known to those of skill in the art and is not of relevance to the present invention.

While the present invention has been utilized to identify calls which should be screened for Outbound International GVNS On-net call processing, persons skilled in the art will appreciate that the present invention can be used to identify calls which should be screened for other types of services at Step 270.

It will be appreciated by persons skilled in the art that the CC-suffix of the present invention can be used to trigger directly, without screening for the SI value, any type of call processing, including processing according to those four categories of additional information discussed above: customer identification parameters, billing parameters, routing and service quality parameters and service priority parameters.

Furthermore, the CC-suffix of the present invention could be utilized by the TA. In the case of FIG. 2F, this means not deleting the CC-suffix at Step 320. At Step 330, the ISC sends a routing number including the CC-suffix to the TA which then recognizes the CC-suffix to trigger specific call processing logic. It is important to note that this transmission of a routing number including a CC-suffix to a TA can be utilized in outbound international GVNS off-net, as well as in Outbound International GVNS On-net, calls. The use of a CC-suffix in outbound international GVNS off-net calls simply requires that the network database, in a step comparable to step 140 of FIG. 2C, return a routing number that comprises a CC-suffix and that the ISC or the TA be capable of interpreting the CC-suffix it receives.

Persons skilled in the art will appreciate that the present invention may be practiced by other than the described embodiments, which are presented for purposes of illustration and not of limitation, and the present invention is limited only by the claims which follow.

We claim:

1. A method of screening a communication before service processing, comprising:
   scanning a routing number of the communication for a first sequence of one or more digits; and
   determining if a service identification, associated with the communication, is of a first service value, if the first sequence of one or more digits is of a first sequence value,
   wherein prior to scanning the routing number for the first sequence of one or more digits, the routing number is scanned for a second sequence of one or more digits indicative of a country to receive the communication.

2. A method of screening a communication for service processing, comprising:
   scanning a routing number of the communication for a first sequence of one or more digits;
   processing the communication in accordance with a first service and in accordance with a first additional treatment, if it is determined that both the first sequence of one or more digits is of a first sequence value and a service identification, associated with the communication, is of a first service value; and
   processing the communication in accordance with the first service in accordance with a second additional treatment, if it is determined that both the first sequence of one or more digits is of a second sequence value and the service identification is of a first service value.

3. A method according to claim 2, wherein the first sequence value comprises at lease one digit whose value is part of the national trunk prefix of a country to receive the communication.

4. A method according to claim 2, wherein the first sequence value comprises at least one digit whose value is part of the domestic application prefix of a country to receive the communication.

5. A method according to claim 2, wherein the first sequence value comprises a national destination code of a country to receive the communication which national destination code receives minimal communication traffic from a country sending the communication.

6. A method according to claim 2, wherein prior to scanning the routing number for the first sequence of one or more digits, the routing number is scanned for a second sequence of one or more digits indicative of a country to receive the communication.

7. An apparatus for screening a communication before service processing, comprising:
- a scanner for analyzing a routing number of the communication for a first sequence of one or more digits;
- a tester that determines if a service identification, associated with the communication, is of a first service value;
- wherein prior to analyzing the routing number for the first sequence of one or more digits, the scanner analyzes the routing number for a second sequence of one or more digits indicative of a country to receive the communication; and
- wherein the tester only determines if the service identification is of a first service value when the scanner detects the first sequence of one or more digits is of a first sequence value.

* * * * *